(12) United States Patent
Lemkin et al.

(10) Patent No.: US 6,386,032 B1
(45) Date of Patent: May 14, 2002

(54) MICRO-MACHINED ACCELEROMETER WITH IMPROVED TRANSFER CHARACTERISTICS

(75) Inventors: Mark A. Lemkin, El Cerrito; Allen W. Roessig, Fremont; Thor Juneau, Berkeley; William A. Clark, Fremont, all of CA (US)

(73) Assignee: Analog Devices IMI, Inc., Berkeley, CA (US)

( * ) Notice: Subject to any disclaimer, the term of this patent is extended or adjusted under 35 U.S.C. 154(b) by 18 days.

(21) Appl. No.: 09/630,535

(22) Filed: Aug. 1, 2000

Related U.S. Application Data

(60) Provisional application No. 60/151,217, filed on Aug. 26, 1999.

(51) Int. Cl.[7] .............................................. G01C 19/00
(52) U.S. Cl. ................................. 73/504.02; 73/514.32; 73/514.18
(58) Field of Search ........................ 73/514.01, 514.15, 73/514.17, 514.32, 514.18, 504.02, 504.12, 504.03, 504.04

(56) References Cited

U.S. PATENT DOCUMENTS

| | | |
|---|---|---|
| 3,709,042 A | 1/1973 | Lee et al. |
| 3,797,320 A | 3/1974 | Clampitt |
| 3,954,024 A | 5/1976 | Staats |
| 4,345,474 A | 8/1982 | Deval |
| 4,435,737 A | 3/1984 | Colton |
| 4,483,194 A | 11/1984 | Rudolf |
| 4,679,434 A | 7/1987 | Stewart |
| 4,711,128 A | 12/1987 | Boura |
| 4,736,629 A | 4/1988 | Cole |
| 4,764,748 A | 8/1988 | Geen et al. |
| 4,839,650 A | 6/1989 | Geen et al. |
| 4,922,756 A | 5/1990 | Henrion |
| 4,932,261 A | 6/1990 | Henrion |
| 5,054,320 A | 10/1991 | Yvon |

(List continued on next page.)

OTHER PUBLICATIONS

Carley, L.R., "An oversampling analog–to–digital converter topology for high–resolution signal acquisition systems," *IEEE Trans. Circuits and Sys.*, Jan. 1987, pp. 83–90.

Naus, P.J.A., et al., "A CMOS stereo 16–bit D/A converter for digital audio," *IEEE J. Solid–state Circuits*, Jun. 1987, pp. 390–395.

Leung, B.H., et al., "Area–efficient multichannel oversampled PCM voice–band coder," *IEEE J. Solid–State Circuits*, Dec. 1988, pp. 1351–1357.

Norsworthy, S.R., et al., "A 14–bit 80–kHz sigma–delta A/D converter: modeling, design, and performance evaluation," *IEEE J. Solid–State Circuits*, Apr. 1989, pp. 256–266.

(List continued on next page.)

Primary Examiner—Richard A. Moller
(74) Attorney, Agent, or Firm—Vierra Magen Marcus Harmon & DeNiro LLP

(57) ABSTRACT

A micromechanical, dithered device comprising a substrate, a movable mass connected to the substrate by a suspension, a position sensor, a dither signal generator, a dither force transducer connected between the substrate and the movable mass, the input of the dither force transducer being connected to the output of the dither signal generator and a calculator taking as inputs at least the position sensor output and the dither signal generator output.

In one embodiment of the invention, the dithered device includes an electrostatic force transducer for applying feedback. In this embodiment, dither force may be directly applied to the mechanical proof-mass utilizing electrostatic structures similar to electrostatic structures used for feedback. The electrostatic dithering structures provide good matching between the feedback and dither electrodes, enabling the use of simple logic for subtraction of the dither signal from the accelerometer output.

39 Claims, 6 Drawing Sheets

U.S. PATENT DOCUMENTS

| | | |
|---|---|---|
| 5,095,752 A | 3/1992 | Suzuki et al. |
| 5,115,291 A | 5/1992 | Stokes |
| 5,134,881 A | 8/1992 | Henrion et al. |
| 5,146,389 A | 9/1992 | Ristic et al. |
| 5,239,871 A | 8/1993 | Reidemeister et al. |
| 5,343,766 A | 9/1994 | Lee |
| 5,345,824 A | 9/1994 | Sherman et al. |
| 5,353,641 A | 10/1994 | Tang |
| 5,428,352 A | 6/1995 | Bennett |
| 5,440,939 A | 8/1995 | Barny et al. |
| 5,447,068 A | 9/1995 | Tang |
| 5,473,946 A | 12/1995 | Wyse et al. |
| 5,495,761 A | 3/1996 | Diem et al. |
| 5,511,420 A | 4/1996 | Zhao et al. |
| 5,540,095 A | 7/1996 | Sherman et al. |
| 5,563,343 A | 10/1996 | Shaw et al. |
| 5,565,625 A | 10/1996 | Howe et al. |
| 5,569,852 A | 10/1996 | Marek et al. |
| 5,594,612 A | 1/1997 | Henrion |
| 5,600,066 A | 2/1997 | Torregrosa |
| 5,605,598 A | 2/1997 | Greiff |
| 5,620,931 A | 4/1997 | Tsang et al. |
| 5,656,778 A | 8/1997 | Roszhart |
| 5,760,305 A | 6/1998 | Greiff |
| 5,796,001 A | 8/1998 | Greiff et al. |
| 5,817,942 A | 10/1998 | Greiff |
| 6,035,694 A | 3/2000 | Dupuie et al. |
| 6,035,714 A | 3/2000 | Yazdi et al. |

OTHER PUBLICATIONS

Friedman, V., et al., "A dual–channel voice–band PCM codec using sigma–delta modulation technique," *IEEE J. Solid–State Circuits*, Apr. 1989, pp. 274–280.

Henrion, W., et al., "Wide dynamic range direct digital accelerometer," *IEEE Solid–State Sensor and Actuator Workshop*, Hilton Head Island, SC, Jun. 1990 p. 153–157.

Gray, R.M., "Quantization Noise Spectra," *Trans. Inform. Theory*, Nov. 1990, pp. 1220–1244.

Smith, T., et al., "A 15b electromechanical sigma–delta converter for acceleration measurements," *IEEE International Solid–State Circuits Conference*, 1994, pp. 160–161.

Lu, et al., "A monolithic surface micromachined accelerometer with digital output," *IEEE J. Solid–State Circuits*, Dec. 1995, pp. 1367–1373.

Norsworthy, et al., Chapter 3 of *Delta–Sigma Data Converters Theory, Design, and Simulation*, IEEE Press, Piscataway, NJ, 1997.

Lemkin, *Micro Accelerometer Design with Digital Feedback Control*, Doctoral Thesis, U.C. Berkeley, Fall 1997.

Lemkin, et al., "A three–axis micromachined accelerometer with a CMOS position–sense interface and digital offset–trim electronics," *IEEE J. Solid–State Circuits*, Apr. 1999, pp. 456–468.

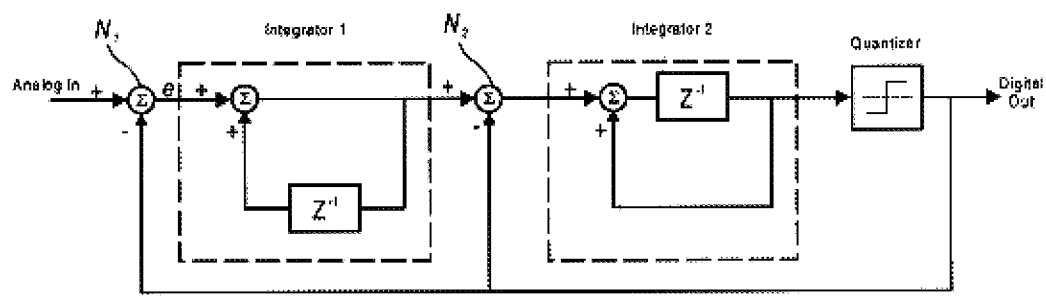
Figure 1
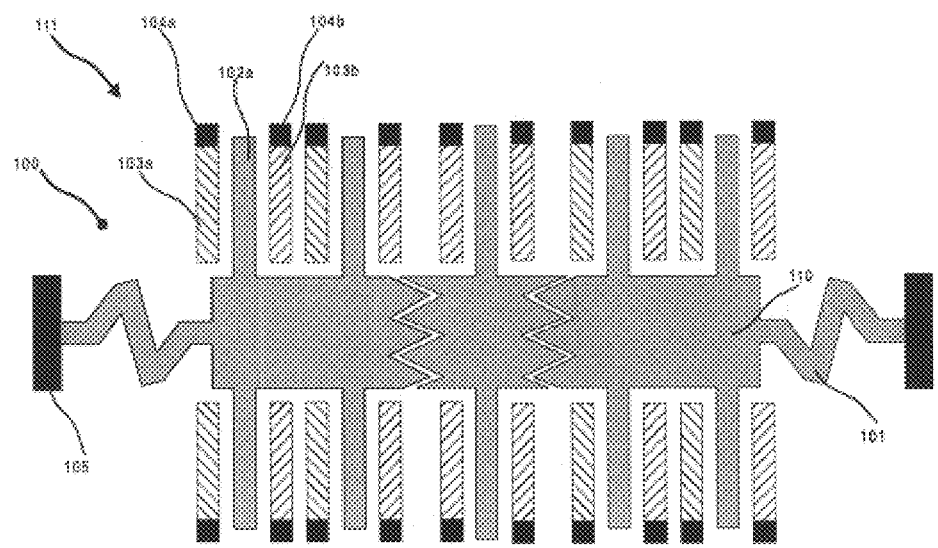
Figure 2
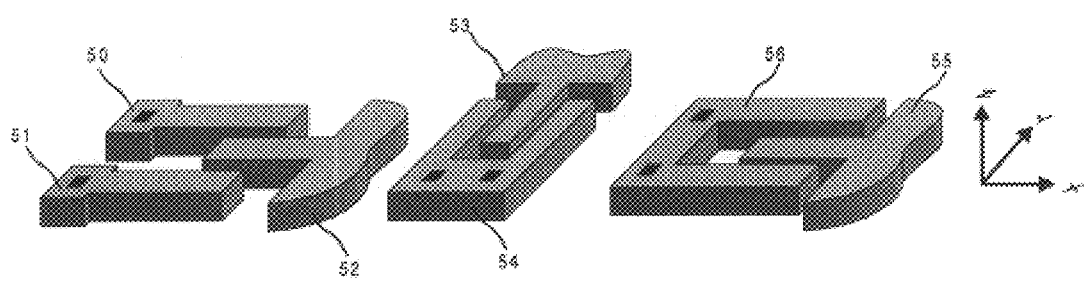
Figure 3 (a) left, (b) center, (c) right

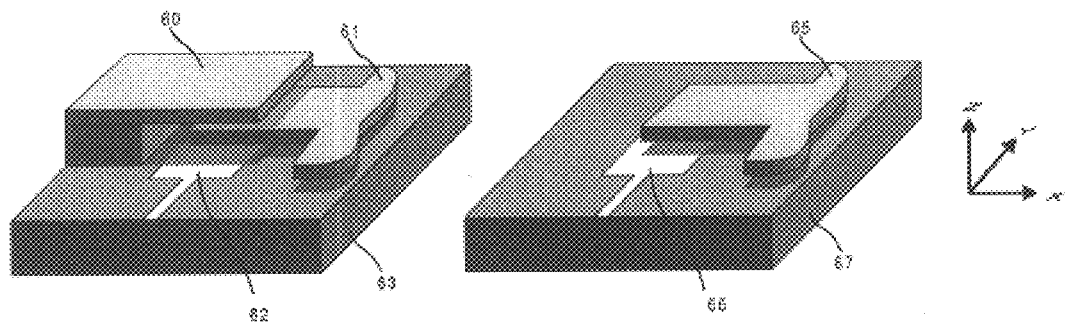
Figure 4 (a) left, (b) right
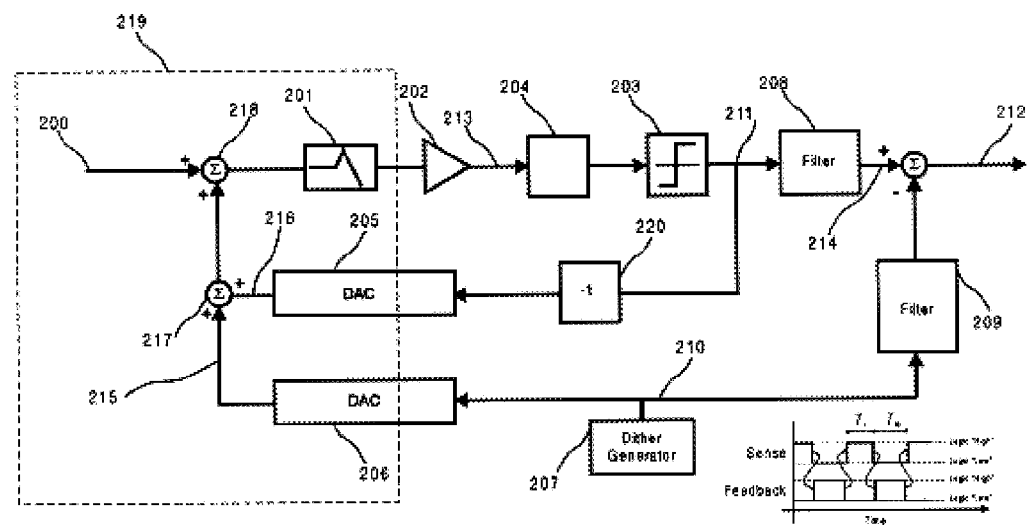
Figure 5

MICRO-MACHINED ACCELEROMETER WITH IMPROVED TRANSFER CHARACTERISTICS

CROSS-REFERENCE TO RELATED APPLICATION

This application claims priority to Provisional Application Ser. No. 60/151,217 filed Aug. 26, 1999 entitled "MICRO-MACHINED ACCELEROMETER WITH IMPROVED TRANSFER CHARACTERISTICS."

IDENTIFICATION OF GOVERNMENT INTEREST

This invention was made with Government support under contract number F49620-98-C-0082 awarded by the Air Force Office of Scientific Research (AFOSR). The Government has certain rights in the invention.

BACKGROUND OF THE INVENTION

1. Field of the Invention

This invention relates generally to accelerometers and more particularly to micromachined accelerometers using digital feedback.

2. Description of the Related Art

Accelerometers are sensors that measure acceleration. Accelerometers can be designed to measure rotational or translational acceleration, as well as Coriolis acceleration in a vibratory rate gyroscope. Accelerometers have uses in many commercial, military, and scientific applications including, but not limited to, inertial navigation, vehicular safety systems such as airbags, ride comfort control, platform stabilization, tilt sensing, and vibration monitoring.

The heart of an accelerometer is a mechanical proof-mass. The proof-mass is connected to a substrate by a suspension. Under an applied acceleration, the proof-mass moves with respect to the substrate. It may be shown that for frequencies below the proof-mass resonant frequency along the sensitive axis, $\omega_n$, the displacement of the proof-mass from its nominal position with respect to the substrate is given by $1/\omega_n^2$ times the applied acceleration. By measuring the displacement of the proof-mass with an electrical interface, acceleration may be inferred.

A sense-element may be operated either open-loop, or placed into a force-feedback loop. Enclosure of a sense-element in a force-feedback loop is commonly called force-balancing or force-rebalancing. In the open-loop configuration, the accelerometer output is given by the change in displacement of the proof-mass multiplied by the gain of the position sense interface. Often piezoelectric materials, piezoresistive materials, or air-gap capacitors are used in conjunction with an electrical position-sense interface to detect proof-mass displacements. In the force-balanced configuration the position-sense interface output is used to feed back a force in a manner that tends to restore the proof-mass to a defined nominal position. Air-gap capacitors or piezoelectric materials are often used to apply feedback forces to the proof mass. In a force-balanced configuration the accelerometer output is not a position, but rather is a quantity representative of the force necessary to keep the proof mass at its nominal position. Closed-loop operation may provide several advantages that are particularly important for miniature micromachined sensors including improved linearity, increased dynamic range, and extended bandwidth. In addition, since the output is the applied force, not displacement, the output typically is less sensitive to device dimensions, such as spring width, making the sensor typically less sensitive to variations in manufacturing.

While there are many ways of implementing a feedback loop, force-feedback with discrete (or digital) levels is particularly attractive because it is simple, provides a digital output, and can be easily implemented in modern integrated microelectronic technologies, thereby enabling co-fabrication of signal processing circuitry with an accelerometer on a single substrate.

Digital feedback is commonly used in analog-to-digital (A/D) voltage converters. The design of A/D voltage converters using digital feedback is well understood by those skilled in the art, with many comprehensive references available on the subject (For example Norsworthy, et al., *Delta-Sigma Data Converters*, IEEE Press, Piscataway, N.J., 1997; Candy, et al., *Oversampling Delta-Sigma Data Converters*, IEEE Press, Piscataway, N.J., 1992). A class of these converters is commonly known as sigma-delta or delta-sigma converters. A block diagram of a typical sigma-delta A/D voltage converter with a digital feedback loop having second-order loop filter dynamics is shown in FIG. 1. A one-bit quantizer is used for analog-to-digital (A/D) conversion at the second integrator output. The one-bit signal is fed back to summing nodes at both the converter input, at node $N_1$, and the internal node $N_2$. Feedback to the internal node stabilizes closed-loop dynamics. By taking the output of the modulator as the one-bit quantizer output, analog-to-digital conversion is achieved. When an input signal is applied to the converter, the one-bit digital feedback is subtracted from the input and the resulting error, e, integrated. Assuming the feedback loop is properly compensated, the negative feedback drives the average of the error, e, over many periods to zero causing the average output to track the input. The feedback loop is operated at a sampling rate $f_s$ typically many times faster than the Nyquist rate of the input signal $f_N$, enabling a moving average of the output to be constructed at the Nyquist rate. By digitally filtering, or averaging, the digital output, the one-bit data stream is converted to a multi-bit digital signal at a lower bandwidth.

While sigma-delta converters can provide numerous advantages over other topologies, including improved linearity and high dynamic range, they are subject to limit cycles, tones, and deadbands caused by the dynamics of the nonlinear feedback loop. These tones, deadbands, and limit cycles may be input-level dependent and can impede construction of an accurate digital signal from the analog input. Several techniques are known to attenuate these effects in analog-to-digital voltage converters including: high-order loop filters, unstable loop filters, nonsubtractive dithering, filtered or shaped dithering, and subtractive dithering. In subtractive dithering, a dither voltage is often applied to the quantizer input. The dither voltage is controlled by a random or pseudorandom noise generator, and may be digitally subtracted from the converter output. Effective subtractive dithering requires that the voltage applied to the input of the converter be precisely controlled so that it may be removed from the output of the converter.

A mechanical mass may be used as a second order loop-filter in an A/D converter where the analog input quantity is acceleration. The proof-mass integrates acceleration, or an equivalent inertial force, twice to position for frequencies above its resonance. A position-sense interface measures the displacement of the proof-mass from its nominal position. There are many position-sense interface topologies and techniques well known by those skilled in the art (See, for example: Smith, T., et al., "A 15b electromechanical sigma-delta converter for acceleration measurements," *IEEE International Solid-State Circuits Conference*, 1994, pp. 160–1; Lu, et al., "A monolithic surface micromachined accelerometer with digital output," *IEEE J. Solid-State Circuits*, December 1995, pp. 1367–73; Lemkin, *Micro Accelerometer Design with Digital Feedback Control*, Doctoral Thesis, U.C. Berkeley, Fall 1997; Lemkin, et al., "A three-axis micromachined accelerometer with a CMOS position-sense interface and digital offset-trim electronics," *IEEE J. Solid-State Circuits*, April 1999, pp. 456–68; U.S. Pat. No. 4,345,474, Aug. 24, 1982, Deval; U.S. Pat. No. 4,679,434, Jul. 14, 1987, Stewart; U.S. Pat. No. 4,736,629, Apr. 12, 1988, Cole; U.S. Pat. No. 4,922,756, May 8, 1990, Henrion; U.S. Pat. No. 5,115,291, May 19, 1992, Stokes; U.S. Pat. No. 5,343,766, Sep. 6, 1994, Lee; U.S. Pat. No. 5,345,824, Sep. 13, 1994, Sherman, et al.; U.S. Pat. No. 5,473,946, Dec. 12, 1995, Wyse, et al.; U.S. Pat. No. 5,511,420, Apr. 30, 1996, Zhao, et al.; U.S. Pat. No. 5,540,095, Jul. 30, 1996, Sherman, et al.; U.S. Pat. No. 5,600,066, Feb. 4, 1997, Torregrosa; U.S. Pat. No. 5,635,638, Jun. 3, 1997, Geen; U.S. Pat. No. 5,992,233, Nov. 30, 1999, Clark; U.S. Pat. No. 6,035,694, Mar. 14, 2000, Dupuie, et al.)

A one-bit quantizer converts the output of the position sense interface into a digital value used for feedback. This value is also taken as the output. Unfortunately, it is impossible to directly obtain the stabilizing inner feedback loop shown in FIG. 1 because there is no way to directly input a velocity to a mechanical system.

A discrete-time Finite Impulse Response (FIR) filter may be used to provide phase lead for stable operation. By using a filter, positive phase may be added only where needed, thereby keeping a majority of the second order noise shaping characteristics of the mechanical system. Note that a 2-tap FIR filter will stabilize the feedback loop. A 2-tap FIR filter is a discrete-time finite difference equation of the form:

$$Out(kT)=Au(kT)+Bu((k-1)T) \qquad \text{Eq. 1}$$

where A and B are constants, T is the sample interval, and k is the sample number. The above equation is discrete-time, but in this general form the filter inputs and outputs are still analog, not digital.

The compensator may be placed either in the analog domain (before the quantizer) or in the digital domain (after the quantizer). In practice, placing the compensator in the feedback path often reduces system linearity, since a multi-bit digital-to-analog voltage converter (DAC) is needed for conversion of the digital feedback signal to an analog voltage.

SUMMARY OF THE INVENTION

A digital accelerometer with improved transfer characteristics. In one embodiment of the invention, subtractive dithering is used to attenuate dead zones and input-output nonlinearities arising, in part, from a nonzero resonant frequency of the proof-mass. The disclosed invention is advantageous because dither force may be directly applied to the mechanical proof-mass utilizing electrostatic structures similar to electrostatic structures used for force-feedback. The electrostatic dithering structures provide good matching between the feedback and dither electrodes, enabling effective subtraction of the dither signal from the accelerometer output.

BRIEF DESCRIPTION OF THE DRAWINGS

For a better understanding of the nature and objects of the invention, reference should be made to the following detailed description taken in conjunction with the accompanying drawings, in which:

FIG. 1 shows a schematic diagram of a second-order, sampled-data, sigma-delta, analog-to-digital voltage converter.

FIG. 2 shows a simplified schematic of a sense-element to enable description of parts comprising a sense element.

FIG. 3 shows three embodiments of unit capacitors suitable for in-plane sensing or forcing.

FIG. 4 shows two embodiments of unit capacitors suitable for out-of-plane sensing or forcing.

FIG. 5 is a schematic of a first embodiment of the invention.

Like reference numerals refer to corresponding parts throughout all the views of the drawings.

DETAILED DESCRIPTION OF THE INVENTION

Figure 6:
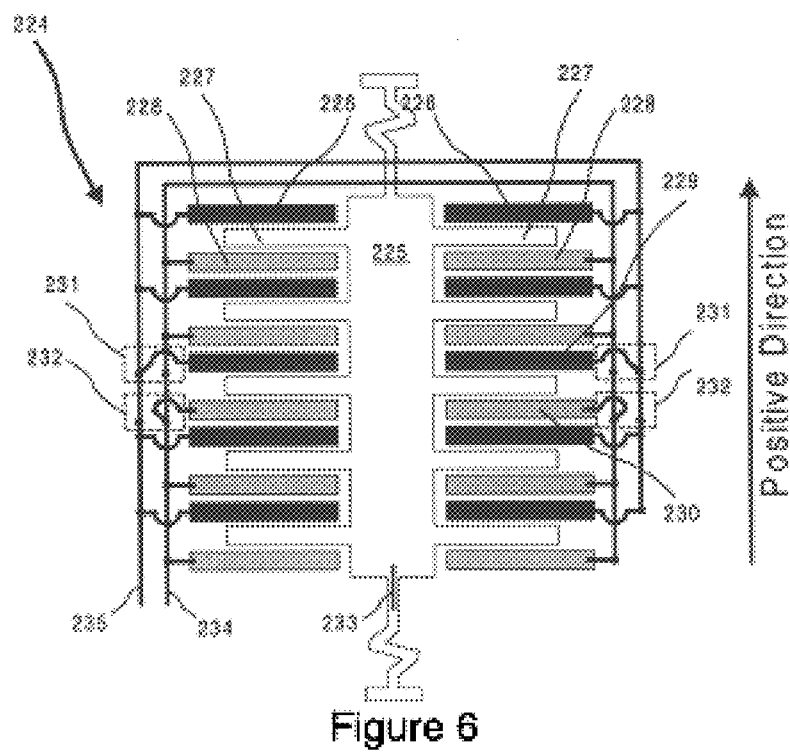
FIG. 6 is a schematic of a simplified sense-element configured for sensing.

FIG. 2 schematically illustrates, for the purpose of teaching the invention, an example of a sense-element. In this figure, sense-element 111 comprises a proof-mass 110, one or more movable electrodes 102a one or more fixed electrodes 103a, 103b fixed to a substrate 100 at anchor points 104, and any suspension elements 101 used to connect proof-mass 110 to substrate 100 at anchor points 105. Pairs of electrodes 102a and 103a, or 102a and 103b form terminals of unit capacitors. It should be understood that many different sense-element configurations exist for measuring in-plane accelerations, out-of-plane accelerations, angular accelerations, and Coriolis accelerations in response to a vibrating mass. These sense-element configurations are well known by those skilled in the art and appear throughout the literature (See, for example: Smith, T., et al., "A 15b electromechanical sigma-delta converter for acceleration measurements," *IEEE International Solid-State Circuits Conference*, 1994, pp. 160–1; Lu, et al., "A monolithic surface micromachined accelerometer with digital output," *IEEE J. Solid-State Circuits*, December 1995, pp. 1367–73; Brosnihan, et al., "Embedded interconnect and electrical isolation for high-aspect-ratio, SOI inertial instruments," *Transducers* 97, June 1997, pp. 637–40; Lemkin, *Micro Accelerometer Design with Digital Feedback Control*, Doctoral Thesis, U.C. Berkeley, Fall 1997; U.S. Pat. No. 4,736,629, Apr. 12, 1988, Cole; U.S. Pat. No. 5,345,824, Sep. 13, 1994, Sherman, et al.; U.S. Pat. No. 5,447,068, Sep. 5, 1995, Tang; U.S. Pat. No. 5,635,638, Jun. 3, 1997, Geen; U.S. Pat. No. 5,992,233, Nov. 30, 1999, Clark.)

Unit capacitors suitable for position sensing or electrostatic forcing may be formed with fixed and movable electrodes in many configurations. Three embodiments of a unit-capacitor having in-plane motion sensitivity are shown in FIG. 3, along with an orthogonal coordinate system. FIG. 3(a) shows a pair of differential parallel-plate unit capacitors. In this differential parallel-plate capacitor, movable electrode 52, attached to the proof-mass, may move along the Y-axis thereby changing the gap between movable electrode 52 and fixed electrodes 50 and 51. Motion along the Y-axis causes opposite changes in capacitance formed by electrode pair 50, 52 and 51, 52. FIG. 3(b) illustrates a balanced, interdigitated comb-finger unit capacitor. In this balanced, interdigitated comb-finger capacitor, movable electrode 53, attached to the proof-mass, may move along the Y-axis thereby changing the overlap area between movable electrode 53 and fixed wrap-around electrode 54. FIG. 3(c) illustrates an offset, interdigitated comb-finger unit capacitor having a nominal offset displacement of movable electrode 55 along the Y-axis, the offset displacement being measured from the center of wraparound electrode 56. In this offset, interdigitated comb-finger capacitor, movable electrode 55, attached to the proof-mass, may move along the Y-axis thereby changing gaps between movable electrode 55 and fixed wrap-around electrode 55. Due to the nominal offset position of the movable electrode with respect to the wrap-around electrode, unit capacitance is monotonic for deflections less than the offset distance of the movable electrode.

Two embodiments of a unit-capacitor having out-of-plane motion sensitivity are shown in FIG. 4, along with an orthogonal coordinate system. FIG. 4(a) shows a pair of differential parallel-plate unit capacitors. In this differential parallel-plate capacitor, movable electrode 61, attached to the proof-mass, may move along the Z-axis thereby changing the gap between movable electrode 61 and electrodes 60 and 62, fixed to substrate 63. Motion along the Z-axis causes opposite changes in the capacitance formed by electrode pair 60, 61 and 61, 62. FIG. 4(b) shows a parallel-plate unit capacitor. In this parallel-plate capacitor, movable electrode 65, attached to the proof-mass, may move along the Z-axis thereby changing the gap between movable electrode 65 and electrode 66, fixed to substrate 67.

Air-gap capacitors are defined as one or more unit capacitors connected in parallel. Although unit capacitors that comprise an air-gap capacitor or set of air-gap capacitors may have nominally equal values, unit capacitors may be designed to have other than nominally-equal values to attain desired feedback or dithering properties. Note that when a sense-element includes two or more air-gap capacitors, the capacitor sets may share a common electrical node; alternatively, the capacitors may have distinct electrical nodes. When the sense element includes two air-gap capacitors, each air-gap capacitor formed by a plurality of unit capacitors connected in parallel, the unit capacitors may be dynamically reconfigured by switches, adjusting connectivity between unit-capacitors forming the air-gap capacitors. For example, parallel-connecting a unit capacitor that is nominally parallel-connected to one or more unit-capacitors forming a first air-gap capacitor, to one or more unit-capacitors forming a second air-gap capacitor reduces the total capacitance of the first air-gap capacitor and increases the total capacitance of the second air-gap capacitor. Adjustment of connectivity between the unit-capacitors may, for instance, provide for a discretely-adjustable feedback force.

The term air-gap capacitor is not intended to imply any requirement on the presence of air between conductive electrodes. Often, gasses between electrodes will exist at a substantially reduced pressure, or vacuum, for lower mechanical damping. In other embodiments of the invention, air-gap capacitors may include between the electrodes any of a number of gasses including, but not limited to, one or more of the following: nitrogen, argon, hydrogen, helium, oxygen, or other gasses or combination of gasses.

A first embodiment of the invention is schematically illustrated in FIG. 5. The system is operated in a sampled-data or discrete-time fashion, with position measurement and force feedback occurring at two distinct, alternating, time intervals. The sample-rate of the system, $f_s$, is equal to $1/T$, where T is the combined duration of the sampling and feedback operations, $T_s$ and $T_{fb}$, respectively, $T_s$ possibly equal to $T_{fb}$. In this embodiment of the invention, a position-sense interface 202 generates an electrical signal 213 representative of proof-mass position by measuring changes in one or more air-gap capacitors included in the sense-element 219. Sense-element 219 includes proof-mass and sensing capacitors, labeled 201. Sense-element 219 provides an output comprising terminals between which a capacitance varying with position may be measured, input terminals for generating an electrostatic feedback force by an applied voltage, and input terminals for generating an electrostatic dither force by an applied voltage. Note that these three sets of terminals may be connected to three or more air-gap capacitors or capacitor pairs. Alternatively, these three sets of terminals may be connected to two or one air-gap capacitors or capacitor pairs, the capacitors or capacitor pairs being multiplexed between the three sets of terminals. When the capacitors are multiplexed in the time domain, switches may be used to alter connectivity. Frequency-domain multiplexing of capacitor function may be performed using different-valued modulation frequencies. For a detailed description of some well-known capacitive sensing and multiplexing techniques see, for example (M. Lemkin, Micro accelerometer design with digital feedback control, Doctoral Thesis, U.C. Berkeley, 1997; C. Lu, et al., "A Monolithic surface micromachined accelerometer with digital output," *ISSCC Digest of Technical Papers*, pp. 160–161, February 1995; Analog Devices, "ADXL05—1 g to 5 g Single Chip Accelerometer with Signal Conditioning," Datasheet, 1995, One Technology Way, Norwood, Mass. 02062.) Electrical signal 213 from the position sense interface is filtered by a stabilizing filter 204, or compensator, that provides phase lead for at least some range of frequency values. The filter 204 may be a Finite- or Infinite-Impulse Response filter (FIR or IIR). Furthermore filter 204 may be a FIR filter of the form $\alpha - z^{-1}$ where $\alpha$ is a constant having a value approximately equal to 2, and $z^{-1}$ is the unit delay operator. In this context, a unit delay corresponds to the time T between the start of feedback operations, or equivalently the time between the start of sensing operations. A one-bit quantizer 203 discretizes the output of the compensator to provide a one-bit digital representation of the compensator output.

The quantizer output is both taken as the feedback-loop output 211 and used to feed back a force that tends to restore the proof-mass to a nominal position. Inversion by gain block 220 attains negative feedback. Force is fed back to the proof-mass using a one-bit digital-to-analog force converter 205 that applies a force to the proof-mass via electrostatic attraction. Digital-to-analog converter 205 typically includes at least one reference voltage, at least one air-gap capacitor, and one or more switches for altering connectivity between air-gap capacitors used for generation of feedback force 216. Note that air-gap capacitors used in feedback force generation may be dedicated, meaning that the sole function of the air-gap capacitors used in feedback force generation is to generate feedback force. Alternatively, air-gap capacitors used in feedback force generation may be multi-purpose, meaning, for instance, switches may be used to alter connectivity of air-gap capacitors during different time intervals, thereby allowing air-gap capacitors used in feedback force generation to be used to sense displacement of the proof-mass during the sense phase.

When sense element 219 includes only a single feedback capacitor that is not discretely adjustable, one-bit digital-to-analog conversion may be attained by applying, for instance, zero voltage, or a voltage reference $V_{fb}$ across the feedback capacitor. When sense element 219 includes two sets of feedback capacitors for bi-directional forcing, neither of which are discretely adjustable, one bit-feedback may be achieved by applying a voltage $V_{fb}$ across one set of feedback capacitors while maintaining zero voltage across the second set. The value of quantizer output 211 determines which set of capacitors receives a voltage difference, and hence electrostatic attraction. Note in this embodiment the feedback voltage $V_{fb}$ remains substantially constant from period to period. Time multiplexing into distinct sense and feedback phases enables air-gap capacitors to be used for both sense and feedback functions, although separate sets of capacitors for sense and feedback may be used. When an air-gap capacitor is used for both sensing and feedback, switches are typically used to alter the connectivity of the sense-element during the sense- and feedback phase, connecting at least one terminal of the sense-element to the position sense interface during the sense phase.

Dead-zones may exist in the input-output transfer function of some prior-art digital accelerometers due, in part, to a non-zero value of proof-mass resonant frequency. These dead zones are beneficially attenuated by the invention. Dead-zones are particularly evident in prior-art accelerometers when the sense-element is packaged in vacuum for low-noise operation. Since the ratio of the signal at the position sense interface output to the value of the feedback force is not well controlled over manufacturing variations, subtractive dithering, in which a dither voltage is added to the feedback loop and subtracted from the output, is not practical since it is difficult to completely subtract the dither from the output. However, the size of a dead-zone may be greatly attenuated with minimal effect on noise by introducing a dithering force signal 215 at the proof-mass, and subtracting a signal representative of the applied dither force from output 211, or filtered output 214, as shown in FIG. 5. Dither force 215 may be single-bit, in which case the dither signal consists of two discrete force levels applied in a sequence determined by dither generator 207, one of the force levels possibly equal to zero. Alternatively, the dither force may be multi-bit in which case the dither signal consists of more than two discrete force levels. In FIG. 5 summation blocks 217 and 218 represent summation of forces, including inertial forces 200 applied to the proof-mass. In either case, dither force 215 is applied to the proof-mass using digital-to-analog converter 206. D/A converter 206 generates electrostatic attraction between at least one stationary dither electrode and at least one movable electrode connected to the proof-mass. Digital-to-analog converter 206 typically includes at least one reference voltage, at least one air-gap capacitor, and one or more switches for altering connectivity between air-gap capacitors used for generation of dither force 215. Note that air-gap capacitors used in dither force generation may be dedicated, meaning that the sole function of the air-gap capacitors used in dither force generation is to generate dither. Alternatively, air-gap capacitors used in dither force generation may be multi-purpose, meaning, for instance, switches may be used to alter connectivity of air-gap capacitors during different time periods, thereby allowing air-gap capacitors used in dither force generation to be used to sense displacement of the proof-mass during the sense phase.

Dither generator 207 produces a digital output 210 having at least one bit that is used in the generation of the dither force. Dither generator output 210 may include one or more discrete tones, random noise, or pseudorandom noise (PN). When dither generator 207 includes a random noise output, the random noise component may be generated from discritization of a random phenomenon, such as thermal noise from a resistor, or flicker noise from a transistor. When pseudorandom noise is used, the noise sequence may be generated from a digital pseudorandom noise source formed with a multi-bit shift-register with a feedback network. For a comprehensive discussion on PN generators, see Golomb, S. W., *Shift Register Sequences revised edition*, Aegean Park Press, Laguna Hills, Calif. 1982. When the dither generator includes a random or pseudorandom noise output, the noise may have a substantially flat power spectral density, or may have a shaped power spectral density. In the case of a shaped power spectral density, the dither generator may include a random or PN source having a substantially flat power spectral density and a filter that amplifies or attenuates portions of the spectra to attain a shaped power spectral density. It should be understood that the aforementioned specific methods of generating a random noise, PN, or multi-toned spectrum are not required to practice the invention. Obviously, any of a number of well-known methods of generating a random noise, PN, or multi-toned spectrum will suffice.

The dither impulse magnitude is typically less than 10% of the full scale feedback impulse, since larger values of dither provide little additional benefit, and can reduce the useful dynamic range of the accelerometer through quantizer overloading or leakage of dither signal into the output. In this context, impulse is defined as the product of the average force acting upon a body and the time during which it acts. The dither force may be generated at the same time force-feedback is applied, using the same feedback voltage $V_{fb}$, by reconfiguring connectivity among unit capacitors. By utilizing the same voltage source and applying dither at the same time feedback is applied, the ratio of dither force magnitude to feedback force magnitude may be accurately maintained over manufacturing variations, voltage source fluctuations, and temperature. Furthermore, when modern semiconductor processing techniques are used to form the accelerometer, this ratio may be accurately set during design of the accelerometer because of the high degree of matching (typically to within 0.1 to 1%) attainable in modern semiconductor processing. The highly stable and well-defined matching of this ratio of dither force to feedback force enables accurate subtraction of dither from filter output 214, attenuating leakage of dither into the accelerometer output 212. Because dither generator output 210 is known, and the ratio of the dither to feedback force is well matched, the value of the dither force applied to the proof mass is known to a high degree of precision and may be accurately subtracted.

As an illustration, for purposes of teaching the invention, FIG. 6 shows an embodiment of a sense-element 224 with 10 equal-sized unit capacitor pairs, in which switches are used to enable all capacitors to be used for sensing. The number, kind, and configuration of unit capacitors schematically illustrated in FIG. 6 is chosen only for clarity in understanding the invention, the invention includes many other embodiments of sense-element. Note that while the dither impulse will typically be less than 10% of the feedback impulse, FIG. 6 illustrates a configuration in which the dither impulse is 25% of the feedback impulse for ease in understanding the principles of the invention.

Figure 7:
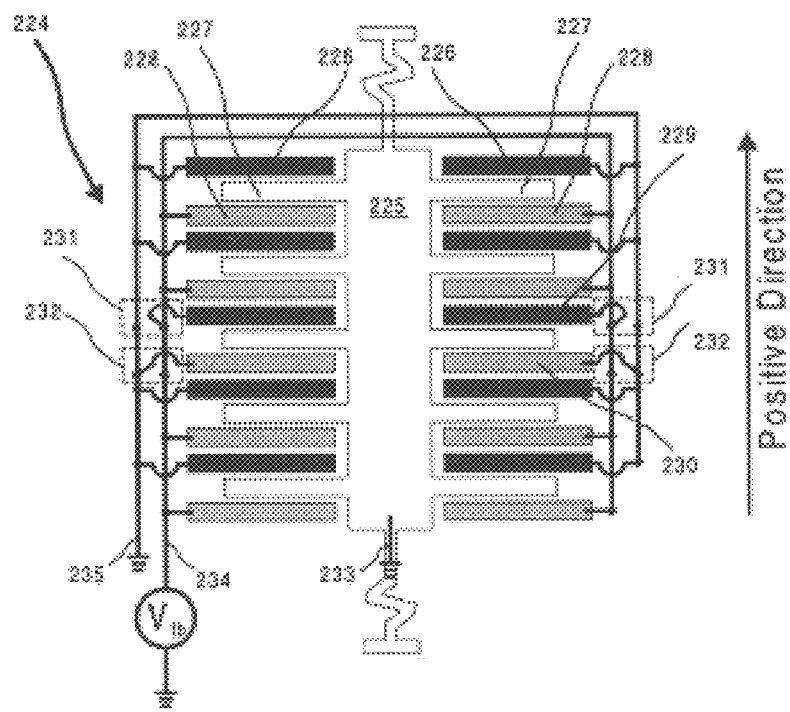
FIG. 7 is a schematic of a simplified sense-element configured to apply a dither force and a feedback force.
Figure 8:
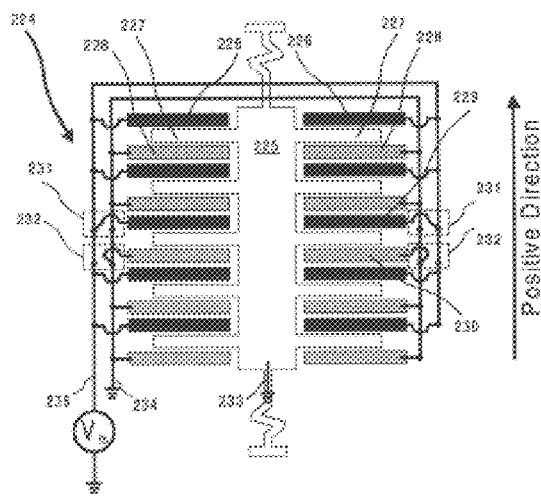
FIG. 8 is a schematic of a simplified sense-element configured to apply a dither force and a feedback force.

FIG. 6 shows sense-element 224 connected for position sensing: positive dither stationary electrodes 229 are connected by switches 231 to feedback stationary electrodes 226, negative dither stationary electrodes 230 are connected by switches 232 to feedback stationary electrodes 228. Thus there are a total of ten pairs of unit capacitors that may be attached to the position sense interface via a common terminal 233, and two independent terminals 234, and 235. FIG. 7 shows sense element 224 arranged to apply a dither force equal to ¼ $F_{fb}$ in the positive direction with a feedback force of $F_{fb}$ in the negative direction using a single voltage source $V_{fb}$. Positive dither stationary electrodes 229 are connected by switches 231 to negative feedback electrodes 228, and to $V_{fb}$ by terminal 234. Negative dither stationary electrodes 230 are connected by switches 232 to positive feedback electrodes 226, and to ground by terminal 235. Common terminal 233, electrically connected to interdigitated fingers 227 by proof-mass 225, is connected to ground. FIG. 8 shows sense element 224 arranged to apply a dither force equal to ¼ $F_{fb}$ in the positive direction with a feedback force of $F_{fb}$ in the positive direction using a single voltage source $V_{fb}$. Positive dither stationary electrodes 229 are connected by switches 231 to positive feedback electrodes 226, and to $V_{fb}$ by terminal 235. Negative dither stationary electrodes 230 are connected by switches 232 to negative feedback electrodes 228, and to ground by terminal 234. Common terminal 233, electrically connected to interdigitated fingers 227 by proof-mass 225, is connected to ground. Switches 231 and 232 that connect between different configurations may be formed, for example, using transistors including MOSFETs, JFETs, or complementary transmission gates. The switches that connect between different configurations are typically controlled using digital logic that operates on inputs from the quantizer output and the dither generator. Additional switches are used to alter connectivity of the sense-element between the sense- and feedback phases, connecting at least one terminal of the sense-element to the position sense interface during the sense phase. Certainly, there are many alternate configurations of air-gap capacitors that may be used without departing from the scope of the invention. For example, in an alternate embodiments, dither capacitors are not switched into terminals multiplexed to the sense interface; feedback and sensing capacitors are distinctly formed air-gap capacitors; different feedback voltages may be applied to the dither and forcing air-gap capacitors; voltages are applied to dither capacitors and feedback capacitors during separate time periods.

The dither force will cause a random, pseudo-random, or tonal acceleration signal to appear at output 211. Since the value of the dither force applied during each cycle is known, the dither signal is correlated with output 211. Because of this correlation, the dither may be digitally subtracted from the accelerometer output. Output 211 is filtered by digital filter 208. The dither signal is filtered by filter 209. Filters 208 and 209 may have different gain, sign, and frequency response characteristics. In addition, either or both filters 208 and 209 may include a pure time delay. Delay may be introduced to minimize residual error in accelerometer output 212.

Figure 9:
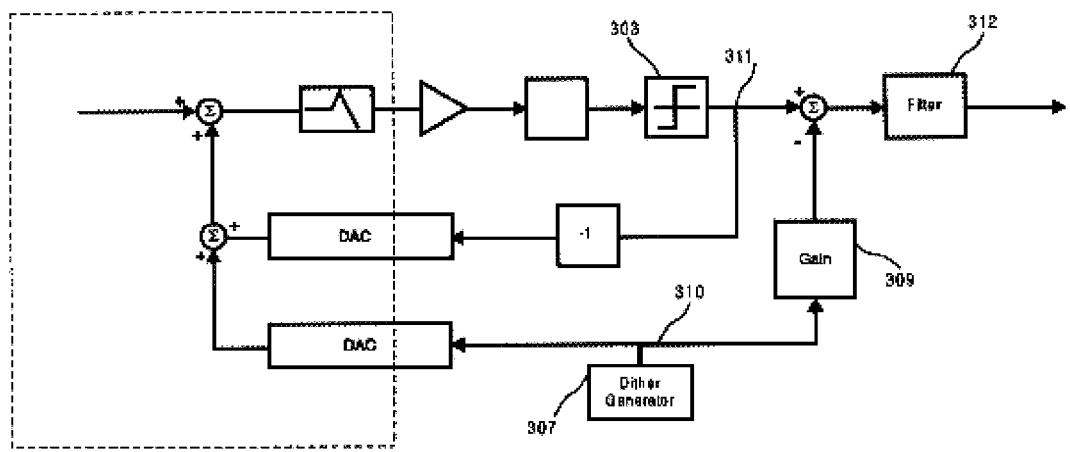
FIG. 9 is a schematic of a second embodiment of the invention.

In a second embodiment of the invention, the dither value or quantizer output is appropriately scaled, the dither subtracted, and the result subsequently filtered. For example, in FIG. 9 the output of dither generator 307 is a one-bit signal, the output of quantizer 303 is a one bit signal, dither generator 307 is used to apply a dither force having an impulse equal to $+\beta$ or $-\beta$ ($|\beta|<1$) f the full scale feedback force impulse to the proof-mass, and quantizer output 311 is used to apply a feedback force having either a positive or negative (i.e. nonzero) value. Then, dither signal 310 may be divided by $1/\beta$ in gain block 309 before being subtracted from the quantizer output, the result then optionally filtered by filter 312. Alternatively, the quantizer signal may be multipled by $1/\beta$ before the dither output is subtracted, the result then optionally filtered. Note that in this example, arithmetic operations occur in a multi-bit space and account for the fact that the one-bit dither and quantizer signals correspond to a nonzero value, i.e. logic 0 corresponds to −Force and logic 1 corresponds to +Force.

Figure 10:
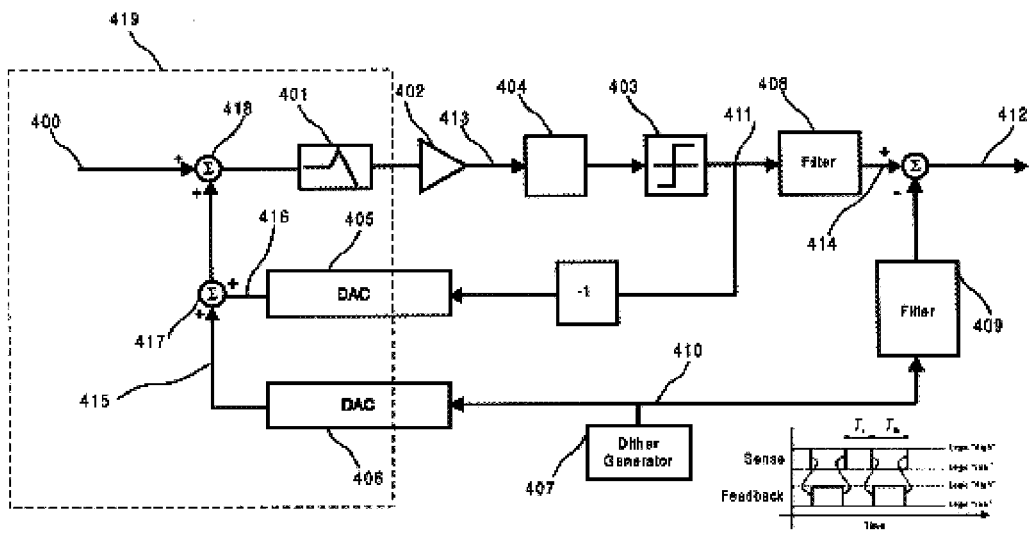
FIG. 10 is a schematic of a third embodiment of the invention.

FIG. 10 illustrates a third embodiment of the invention to aid in the teaching of the invention. In this embodiment, filter 408 is a 4-tap $sinc^3$ FIR filter and dither filter 409 is a 4-tap $sinc^1$ FIR filter with three pure delay elements: $(z^{-1})^3$. Dither signal 415 is a single-bit pseudorandom force with impulse magnitude scaled by a factor $1/K_d$, $K_d>1$, with respect to one-bit feedback force 416. Scaling may be attained by making the total dither forcing electrode area $1/K_d$ times smaller than the total feedback force electrode area when the gap between electrode plates is substantially the same for dither and forcing capacitors and the duration of feedback and dither forcing is the same. The DC gain ratio of dither filter 409 to filter 408 is scaled to attain a ratio of $1/K_d$. Note that certain choices of $K_d$ and FIR filters may be made that greatly simplify implementation when binary computation techniques are used. For example, a dither force of $1/16$ times $F_{fb}$ ($K_d=16$) in conjunction with $sinc^3$ filter having coefficients: 1 $z^{-10}$+3 $z^{-9}$+6 $z^{-8}$+10 $z^{-7}$+12 $z^{-6}$+12 $z^{-5}$+10 $z^{-4}$+6 $z^{-3}$+3 $z^{-2}$+1 $z^{-1}$ and $sinc^1$ filter with an additional delay of $z^{-3}$:1 $z^{-7}$+1 $z^{-6}$+1 $z^{-5}$+1 $z^{-4}$ greatly attenuates dither noise at low frequencies of interest. The sum of the impulse responses, or DC gain, of the $sinc^3$ and $sinc^1$ filters are 64 and 4 respectively. Since these responses have a ratio of 16 to 1, no scaling is needed and subtractive dithering may be achieved by simple subtraction. When $K_d=32$, gain-scaling may be attained by multiplying the output of filter 408 by 2 (bit shifting by 1 bit in a base 2 system) before subtracting dither filter 409 output to attain a DC-gain ratio of 32:1. The choice of these two specific filters is not unique in having computational efficiency, in fact many other possible filter choices may be made having similar computational benefits including $sinc^n$ filters (n a positive integer) with a varying number of taps. Furthermore, output 412 may be further filtered and decimated using a decimation filter so as to provide a higher-bit representation at a lower sample rate of the acceleration input.

Figure 11:
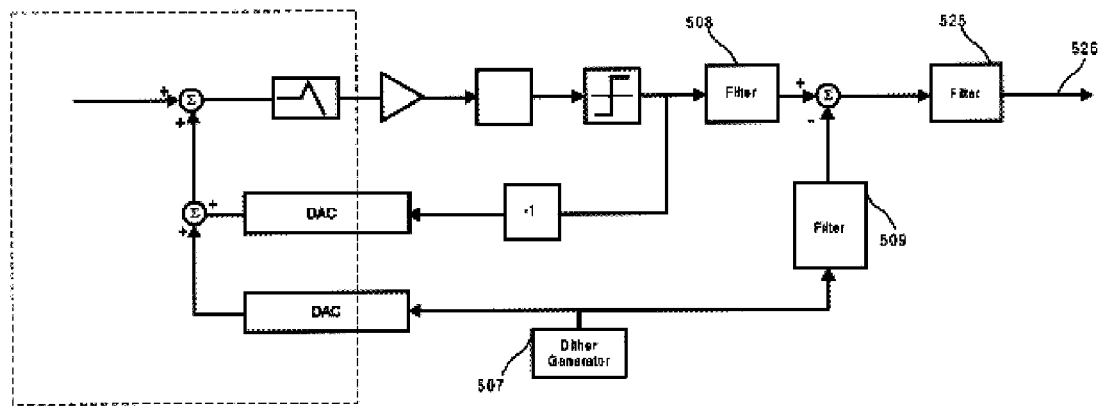
FIG. 11 is a schematic of a fourth embodiment of the invention.
Figure 14:
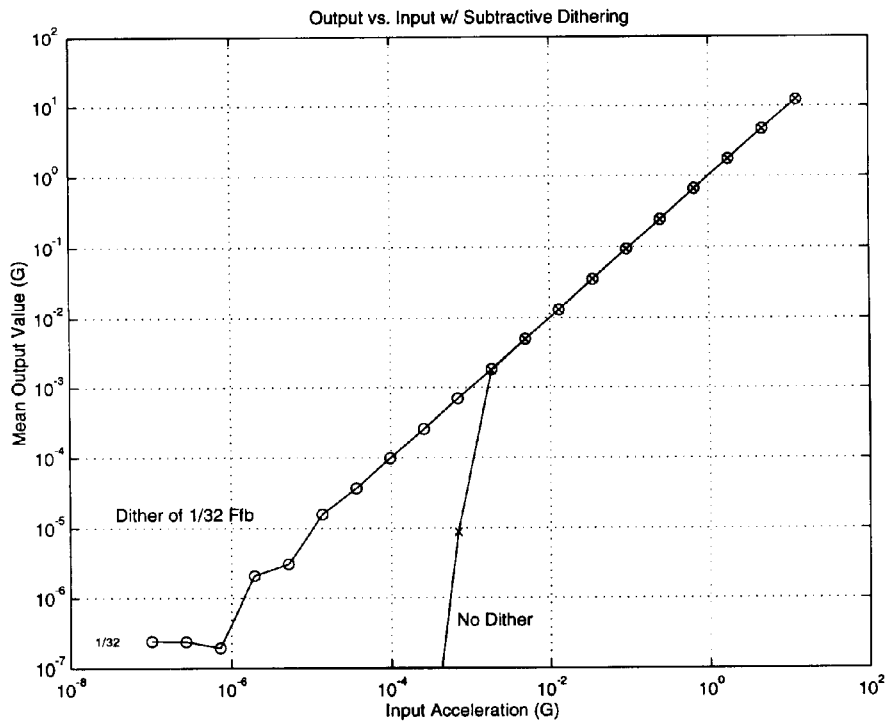
FIG. 14 is a graph of simulation results showing efficacy of the invention.
Figure 15:
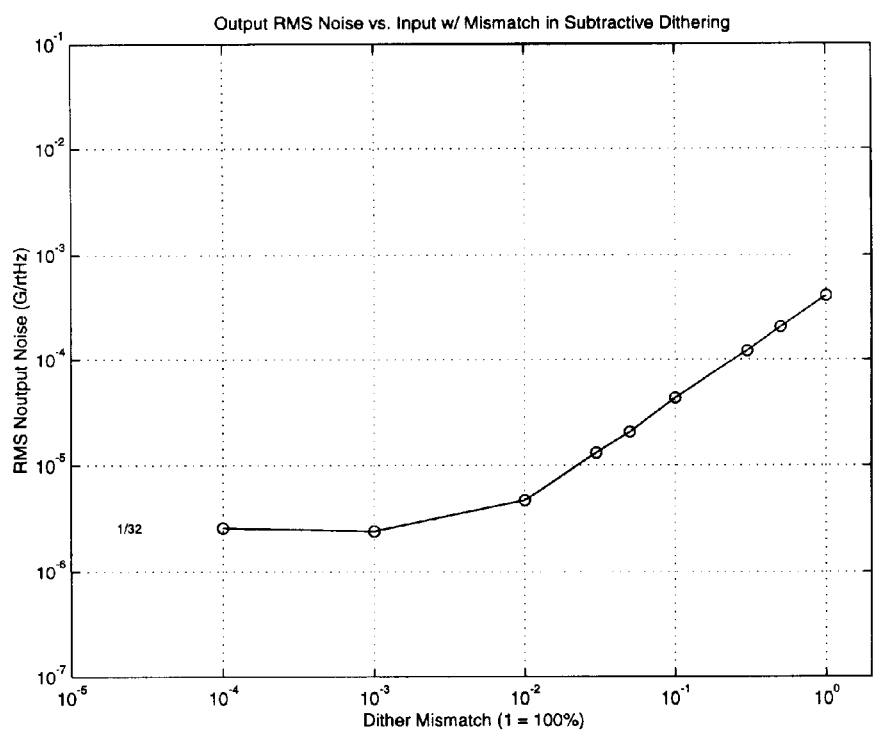
FIG. 15 is a graph of simulation results showing the effect of nonidealities on performance.

As an example of the efficacy of the invention, simulation results of a fourth embodiment are shown in FIG. 11. The fourth embodiment of the invention includes 18-bit shift-register based PN generator 507, 4-tap $sinc^1$ dither filter with a DC gain of 2 and three pure delay elements 509, 4-tap $sinc^3$ output filter 508 with a DC gain of 64, with a second stage $sinc^3$ decimation filter 525 having a decimation ratio of 125. In the fourth embodiment, scale factor $K_d$ equals 32. Downsampling before filter 525, in conjunction with decimation filter 525 yields an overall decimation ratio at output 526 of 500. In this simulation the sample rate is $f_s=1$ MHz, full scale is +/−12.5 G where 1 G=9.8 m/s$^2$, the proof-mass fundamental resonant frequency in the sensing direction is 2 kHz, and the mechanical quality factor of the fundamental mode Q is 10000. FIG. 14 plots the mean output value vs input value with and without subtractive dither. Without dither, the accelerometer exhibits a dead zone and is unable to resolve accelerations less than about 1×10$^{-2}$ m/s$^2$ (~0.001 G): the output drops to zero independent of the input. With subtractive dither enabled the resolution of the combined system is improved to better than 1×10$^{-5}$ m/s$^2$ (~1×10$^{-6}$ G), three orders of magnitude better. The effect of mismatch in the ratio of feedback force to dither force is simulated in FIG. 15. Mismatch of up to about 1% has little effect on output noise. Note that 1% matching is readily obtained in most microfabrication technologies.

Figure 12:
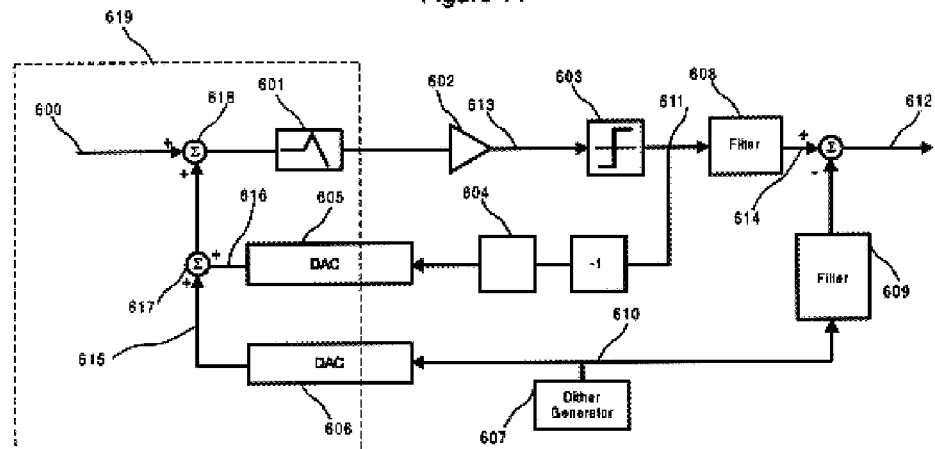
FIG. 12 is a schematic of a fifth embodiment of the invention.

A fifth embodiment of the invention is shown in FIG. 12. In this embodiment of the invention, a position-sense interface 602 generates an electrical signal 613 representative of proof-mass position by measuring changes in one or more air-gap capacitors included in the sense-element 619. Sense-element 619 includes proof-mass and sensing capacitors, labeled 601. The electrical signal from the position sense interface 613 is discretized using quantizer 603 to provide a one-bit digital representation of the position-sense interface output. Quantizer output 611 is taken as the feedback-loop output as well as used to feed back a force that tends to restore the proof-mass to a nominal position. To stabilize the feedback loop a digital filter 604 provides phase lead for at least some range of frequency values. Digital filter 604 may be a Finite- or Infinite-Impulse Response filter (FIR or IIR). Furthermore, filter 604 may be a FIR filter of the form $\alpha - z^{-1}$ where $\alpha$ is a constant having a value approximately equal to 2, and $z^{-1}$ is the unit delay operator. Note that the output of filter 604 is greater than one bit.

Force is fed back to the proof-mass using digital-to-analog force converter 605, having two or more bits, that applies a force to the proof-mass via electrostatic attraction. Digital-to-analog converter 605 typically includes at least one reference voltage, at least two air-gap capacitors, and one or more switches for altering connectivity used for generation of discretely-adjustable feedback force 616 (See for example, Lemkin, M.; Boser, B. E., "A micromachined fully differential lateral accelerometer," *IEEE* 1996 *Custom Integrated Circuits Conference*, May 1996, p. 315–18.) Note that air-gap capacitors used in feedback force generation may be dedicated, meaning that the sole function of the air-gap capacitors used in feedback force generation is to generate feedback force. Alternatively, air-gap capacitors used in feedback force generation may be multi-purpose, meaning, for instance, switches may be used to alter connectivity of air-gap capacitors during different time intervals, thereby allowing air-gap capacitors used in feedback force generation to be used to sense displacement of the proof-mass during the sense phase.

Figure 13:
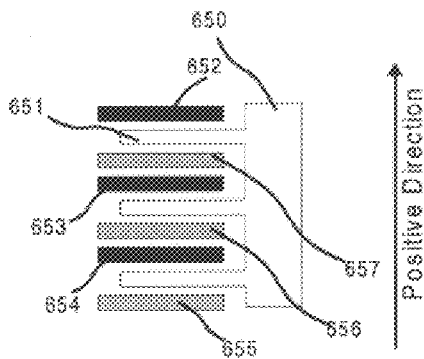
FIG. 13 is a schematic of a multi-bit digital-to-analog force converter.

Multi-bit digital-to-analog conversion may be attained by applying, for instance, zero voltage, or a voltage $V_{fb}$ across a discrete number of dynamically-configured air-gap feedback capacitors. For example, a 2-dimensional representation of a simplified air-gap capacitor for a 2-bit digital-to-analog converter is shown in FIG. 13; however, many unit-capacitor configurations may be used. In this figure, proof-mass 650 is attached to movable fingers 651, fixed fingers 652 through 657 are anchored to a substrate. The value of the compensator output determines which set of capacitors receives a voltage difference, and hence electrostatic attraction. For a 2-tap FIR filter of the form $2-z^{-1}$ with one-bit quantizer output equal to {−1,1}, four possible digital compensator outputs exist: −3, −1, 1, and 3. In FIG. 13, a digital −3 is converted to an analog feedback force by energizing an air-gap capacitor formed of unit capacitor 656/651 and an air-gap capacitor formed of unit-capacitors 655/651, 657/651; digital −1 is converted to an analog feedback force by energizing capacitor 656/651; digital 1 is converted to an analog feedback force by energizing capacitor 653/651; a digital 3 is converted to an analog feedback force by energizing an air-gap capacitor formed of unit capacitor 653/651 and an air-gap capacitor formed of unit-capacitors 652/651, 654/651, where reference designator a/b refers to a unit capacitor comprising terminals formed by fingers having reference designators a and b. Note that the DAC may not necessarily have a linear input-output relationship. Furthermore, unit-capacitors comprising the air-gap feedback capacitors may be designed to have dissimilar values to attain desired feedback characteristics.

In the fifth embodiment, dither force is applied and subtracted using structures, filters, and gain similar to the first through fourth embodiments.

In yet another embodiment of the invention the output of compensator 604 may be taken as the input to filter 608.

The invention may be co-fabricated with integrated circuitry on a single chip using many fabrication methods including, but not limited to: surface micromachining, deep-RIE etching, SOI-based micromachining, epi-polysilicon micromachining, or similar fabrication methods or technologies. Examples of some of these fabrication technologies may be found in, for example: U.S. PPA Application Serial No. 60/127,973, Filed Apr. 6, 1999; U.S. patent application Ser. No. 09/322,381, filed May 28, 1999; U.S. Pat. No. 5,326,726, Jul. 5, 1994, Tsang, et al.; U.S. Pat. No. 5,343,064, Aug. 30, 1994, Spangler, et al.; U.S. Pat. No. 5,747,353, May 5, 1998, Bashir, et al.; U.S. Pat. No. 5,798,283, Aug. 25, 1998, Montague, et al.; U.S. Pat. No. 5,504,026, Apr. 2, 1996, Kung.

Alternatively, different components comprising the invention may be formed as discrete elements. For example, the sense element may be formed on a silicon or quartz substrate and the interface, control and signal processing circuitry may be formed on one or more separate substrates as described in, for example: U.S. Pat. No. : 5,198,390, Mar. 30, 1993, MacDonald, et al.; U.S. Pat. No. 5,576,250, Nov. 19, 1996, Diem, et al.; U.S. Pat. No. 5,882,532, Mar. 16, 1999, Field, et al.; or Smith, T. et. al., "A 15b Electromechanical Sigma-Delta Converter for Acceleration Measurements," ISSCC Dig. Tech. Papers, pp. 160–161, 1994. Alternatively, the sense-element may be bulk-micromachined by any of a number of well known methods, interface, control and signal processing circuitry may be formed on one or more separate substrates, and the electrical and mechanical substrates may be connected by one or more wire bonds.

The foregoing description, for the purposes of explanation, used specific nomenclature and specificities to provide a thorough understanding of the invention. In other instances, well-known circuits and devices are shown in block diagram form in order to avoid unnecessary distraction from the underlying invention. It will be apparent to one skilled in the art that the specific details are not required in order to practice the invention. Thus, the foregoing descriptions of specific embodiments of the invention are presented for the purposes of illustration and description. The embodiments were chosen and described in order to best explain the principles of the invention and its practical applications, to thereby enable others skilled in the art to best utilize the invention and various embodiments with various modifications as are suited to the particular use contemplated. They are not intended to be exhaustive or to limit the invention to the precise forms disclosed, obviously many modifications and variations are possible in view of the above teachings. For example, possible variations include continuous-time as opposed to sampled-data operation; multi-bit quantization; addition of extra filters to create a higher-order feedback loop with increased noise shaping; multi-stage or cascaded modulators; use of a piezoelectric as opposed to a capacitive-based sensing and forcing mechanism; or an open-loop accelerometer using a conventional analog-to-digital converter connected to the output of the position-sense interface wherein subtractive dithering is used to attain reduced quantization error in the conventional analog-to-digital converter.

What is claimed is:

1. A micromechanical, dithered device comprising:
    a substrate;
    a movable mass connected to said substrate by at least one flexible beam;
    a position sensor having an output;
    a dither signal generator having an output;
    a dither force transducer connected to said substrate and to said movable mass, said dither force transducer having an input, the input of said dither force transducer connected to the output of said dither signal generator; and
    a calculator having at least two inputs and one output, said calculator inputs connected to at least said position sensor output and said dither signal output.

2. The micromechanical, dithered device of claim 1 further including:
    a force transducer connected to said substrate and to said movable mass; and
    a feedback connection between said position sensor output and said force transducer.

3. The micromechanical, dithered device of claim 1 wherein said dither signal generator comprises a signal generator selected from the following list: pseudorandom noise generator, random noise generator, tone generator comprising at least one tone.

4. A micromachined accelerometer having improved transfer characteristics comprising:
    a sense-element having an output, a first input, and a second input;
    sensing circuitry having an input and an output, the input of said sensing circuitry connected to the output of said sense-element;
    a quantization circuit having an output;
    a feedback connection between said quantization circuit output and said first input of said sense-element;
    a dither signal generator having an output;
    a connection between said dither signal generator output and said second input of said sense-element; and
    a calculator having an input connected to said dither signal generator output, having an input connected to said quantization circuit output, and having an output.

5. The micromachined accelerometer of claim 4 wherein said sense-element comprises:
    a substrate having a first conducting area and a second conducting area; and
    a movable mass connected to said substrate by at least one flexible beam, said movable mass having a first conducting area and a second conducting area, each conducting area forming an air-gap capacitor with a corresponding conducting area on the substrate.

6. The micromachined accelerometer of claim 5 wherein said first and second substrate conducting areas are electrically isolated.

7. The micromachined accelerometer of claim 5 wherein said first and second substrate conducting areas are electrically connected.

8. The micromachined accelerometer of claim 5 wherein said first and second movable-mass conducting areas are electrically isolated.

9. The micromachined accelerometer of claim 5 wherein said first and second movable-mass conducting areas are electrically connected.

10. The micromachined accelerometer of claim 4 wherein said sense-element comprises:
    a substrate having a first conducting area, a second conducting area, and a third conducting area; and
    a movable mass connected to said substrate by at least one flexible beam, said movable mass having a first conducting area, a second conducting area, and a third conducting area, each conducting area forming an air-gap capacitor with a corresponding conducting area on the substrate.

11. The micromachined accelerometer of claim 5 wherein said sense-element further comprises:
    a multiplexor comprising two or more switches, said multiplexor having a first terminal connected to at least one air-gap capacitor, having a second terminal, and having a third terminal.

12. The micromachined accelerometer of claim 11 wherein said multiplexor comprises a time-division multiplexor.

13. The micromachined accelerometer of claim 11 wherein said multiplexor comprises a frequency-division multiplexor.

14. The micromachined accelerometer of claim 4 wherein said dither signal generator comprises a signal generator selected from the following list: pseudorandom noise generator, random noise generator, tone generator comprising at least one tone.

15. The micromachined accelerometer of claim 4 wherein said sensing circuitry, said quantization circuit, said dither signal generator, and said calculator operate at discrete, recurring time periods.

16. The micromachined accelerometer of claim 4 wherein said sensing circuitry operates continuously.

17. The micromachined accelerometer of claim 4 wherein said sense-element and said sensing circuitry are formed on a common substrate.

18. The micromachined accelerometer of claim 4 wherein said sense-element and said calculator are formed on separate substrates.

19. The micromachined accelerometer of claim 4 wherein the output of said calculator comprises a quantity representative of an acceleration selected from the following list: translational acceleration applied to the accelerometer, angular acceleration applied to the accelerometer, Coriolis acceleration generated in response to a rotation rate applied to the accelerometer.

20. A micromachined accelerometer having improved transfer characteristics comprising:
    (a) a substrate;
    (b) a movable mass connected to said substrate by at least one flexible beam;

(c) a transducer group including at least one transducer, said at least one transducer comprising:
a dither input, and a dither output;
a feedback input and a feedback output;
a position output, said position output responsive to the relative position between said mass and said substrate;
(d) sensing circuitry having an input and an output;
(e) a dither signal generator having an output;
(f) a connection between said dither signal generator output and said dither input;
(g) a quantization circuit having an output;
(h) a feedback connection between said quantization circuit output and said feedback input; and
(i) a calculator having an input connected to said dither signal generator output, having an input connected to said quantizer output, and having an output.

21. The micromachined accelerometer of claim 20 wherein said dither output and said feedback output comprise forces, the magnitude of each force being controlled by a common reference voltage.

22. The micromachined accelerometer of claim 20 wherein said dither output and said feedback output comprise forces, said dither output and said feedback outputs occurring simultaneously.

23. The micromachined accelerometer of claim 20 wherein said transducer group comprises:
a substrate having a first conducting area and a second conducting area; and
a movable mass connected to said substrate by at least one flexible beam, said movable mass having a first conducting area and a second conducting area each conducting area forming an air-gap capacitor with a corresponding conducting area on the substrate.

24. The micromachined accelerometer of claim 23 wherein said first and second substrate conducting areas are electrically isolated.

25. The micromachined accelerometer of claim 23 wherein said first and second substrate conducting areas are electrically connected.

26. The micromachined accelerometer of claim 23 wherein said first and second movable-mass conducting areas are electrically isolated.

27. The micromachined accelerometer of claim 23 wherein said first and second movable-mass conducting areas are electrically connected.

28. The micromachined accelerometer of claim 20 wherein said transducer group further comprises:
a multiplexor comprising two or more switches, said multiplexer having a first terminal connected to at least one air-gap capacitor, having a second terminal, and having a third terminal.

29. The micromachined accelerometer of claim 28 wherein said multiplexor comprises a time-division multiplexor.

30. The micromachined accelerometer of claim 28 wherein said multiplexor comprises a frequency-division multiplexor.

31. The micromachined accelerometer of claim 20 wherein said dither signal generator comprises a signal generator selected from the following list: pseudorandom noise generator, random noise generator, tone generator comprising at least one tone.

32. The micromachined accelerometer of claim 20 wherein:
said feedback output comprises a feedback impulse, the feedback impulse having a maximum magnitude;
said dither output comprises a dither impulse, the dither impulse having a maximum magnitude; and
said maximum magnitude of the feedback impulse is a power of 2 times greater than said maximum magnitude of the dither impulse.

33. The micromachined accelerometer of claim 20 wherein:
said feedback output comprises a feedback impulse, the feedback impulse having a maximum magnitude;
said dither output comprises a dither impulse, the dither impulse having a maximum magnitude; and
said maximum magnitude of the dither impulse is 10 percent or less than said maximum magnitude of the feedback impulse.

34. The micromachined accelerometer of claim 20 wherein said calculator comprises:
a first filter having an input and an output, the input connected to said dither signal generator output;
a second filter having an input and an output, the input connected to said quantizer output; and
a summer having a first input, a second input, and an output, the first input connected to said first filter output, and the second input connected to said second filter output.

35. The micromachined accelerometer of claim 34 wherein said calculator further comprises a third filter having an input and an output, said third filter input connected to said summer output.

36. The micromachined accelerometer of claim 34 wherein said first filter comprises a $sinc^1$ filter and said second filter comprises a $sinc^1$ filter.

37. The micromachined accelerometer of claim 20 wherein said calculator comprises:
a gain-scaler having an input and an output, the input connected to said dither signal generator output; and
a summer having a first input, a second input, and an output, the first input connected to said quantizer output, and the second input connected to said gain-scaler output.

38. The micromachined accelerometer of claim 37 wherein said calculator further comprises a filter having an input and an output, said filter connected to said summer output.

39. A micromachined accelerometer having improved transfer characteristics comprising:
(a) a substrate;
(b) a movable mass connected to said substrate by at least one flexible beam;
(c) a time-multiplexed transducer group at least periodically comprising:
a dither transducer, said dither transducer having an input, and having an output force;
a feedback transducer, said feedback transducer having an input, and having an output force;
a position transducer having an output responsive to the relative position between said mass and said substrate;
(d) sensing circuitry having an input and an output;
(e) a dither signal generator having an output;
(f) a connection between said dither signal generator output and said dither transducer input;
(g) a quantization circuit having an output;
(h) a feedback connection between said quantization circuit output and said feedback transducer input; and
(i) a calculator having an input connected to said dither signal generator output, having an input connected to said quantizer output, and having an output.

* * * * *

UNITED STATES PATENT AND TRADEMARK OFFICE
CERTIFICATE OF CORRECTION

PATENT NO.   : 6,386,032 B1
DATED        : May 14, 2002
INVENTOR(S)  : Lemkin

It is certified that error appears in the above-identified patent and that said Letters Patent is hereby corrected as shown below:

<u>Column 16,</u>
Line 29, after "sinc" replace superscript "1" with superscript -- 3 --

Signed and Sealed this

Seventeenth Day of August, 2004

JON W. DUDAS
*Acting Director of the United States Patent and Trademark Office*